United States Patent [19]

Hasegawa

[11] Patent Number: 4,731,212
[45] Date of Patent: Mar. 15, 1988

[54] METHOD FOR CONTINUOUSLY MANUFACTURING SLIDE FASTENER COUPLING ELEMENTS

[75] Inventor: Akira Hasegawa, Kurobe, Japan

[73] Assignee: Yoshida Kogyo K. K., Tokyo, Japan

[21] Appl. No.: 941,830

[22] Filed: Dec. 15, 1986

Related U.S. Application Data

[63] Continuation of Ser. No. 687,288, Dec. 28, 1984, abandoned.

[30] Foreign Application Priority Data

Dec. 29, 1983 [JP] Japan ............................... 58-245937

[51] Int. Cl.[4] .............................................. B29D 5/00
[52] U.S. Cl. .................................... 264/167; 264/234; 264/237; 264/251; 264/252; 264/280; 264/285; 425/545; 425/814
[58] Field of Search .............. 264/251, 252, 280, 285, 264/167, 234, 237, 345, 348, 295, 339; 425/545, 814

[56] References Cited

U.S. PATENT DOCUMENTS

| 4,257,839 | 3/1981 | Yoshida et al. ............... 425/545 |
| 4,406,849 | 9/1983 | Takahashi et al ............. 264/167 |
| 4,599,065 | 7/1986 | Takahashi ..................... 425/814 |

*Primary Examiner*—Jan H. Silbaugh
*Assistant Examiner*—Hubert C. Lorin
*Attorney, Agent, or Firm*—Hill, Van Santen, Steadman & Simpson

[57] ABSTRACT

In a method for continuously manufacturing slide fastener coupling elements, a molded strip of coupling element blanks is folded by a first folder unit about its longitudinal axis while still hot into a U-shaped cross-section to provide a folded strip of coupling element blanks each having a width larger than a predetermined width of each of the coupling elements as ultimately shaped. After having been heated by a hot-air blower, the hot folded strip of blanks is shaped by a second folder unit into slide fastener coupling elements of a finalized shape and dimensions through a plurality of bending stages in which the widths of the coupling element blanks are constricted stepwise by the second folder unit as the folded strip of blanks is fed therethrough.

3 Claims, 19 Drawing Figures

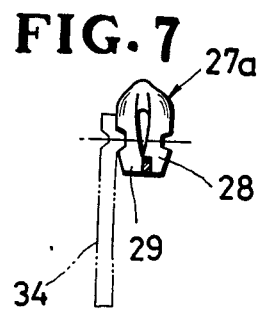
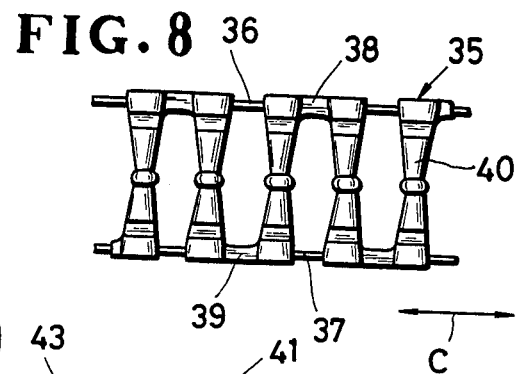
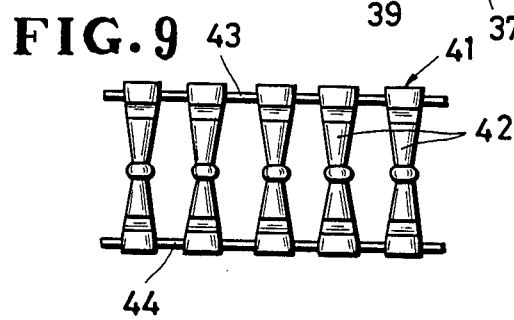
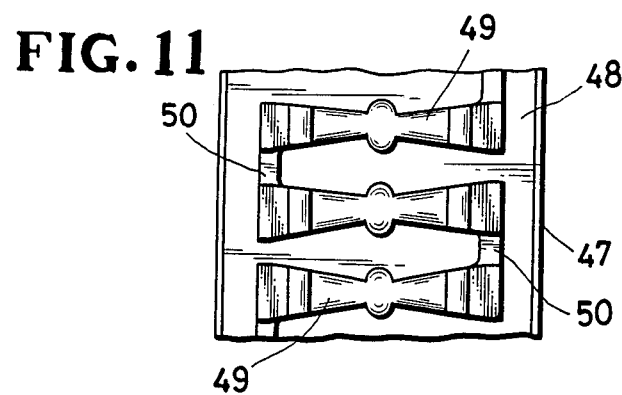
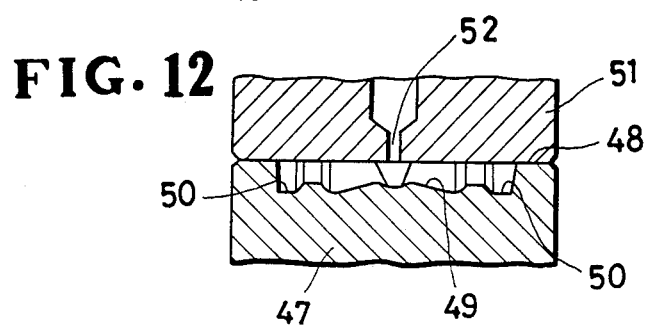

METHOD FOR CONTINUOUSLY MANUFACTURING SLIDE FASTENER COUPLING ELEMENTS

This is a continuation of application Ser. No. 687,288, filed Dec. 28, 1984, now abandoned.

BACKGROUND OF THE INVENTION

1. Field of the Invention

The present invention relates to a method of and an apparatus for continuously manufacturing molded slide fastener coupling elements of thermoplastic synthetic resin.

2. Prior Art

In a prior art shown in U.S. Pat. No. 4,406,849, issued on Sept. 27, 1983, a molded strip of coupling element blanks while still hot is folded by a single folder unit about its longitudinal axis into a U-shaped cross-section to provide semi-finished coupling heads, with legs on each side thereof. Then, the folded strip of blanks is shaped into a train of slide fastener coupling elements of a finalized shape and dimensions as it passes through a straight slot of a progressively constricted contour in a guide block while the legs are being concentrically heated. With such a single step of folding, the thermoplastic material of the strip of blanks is likely to be stretched unevenly which would result in a folded strip of blanks having an irregular shape and dimensions.

SUMMARY OF THE INVENTION

It is therefore an object of the present invention to provide a method of continuously manufacturing slide fastener coupling elements of a uniform shape and dimensions at an increased rate of production, from a strip of coupling element blanks without causing the latter to be deformed irregularly while being processed into coupling elements.

Another object of the present invention is to provide an apparatus for carrying out the above-mentioned method that is compact and hence occupies a relatively small space for installation.

According to the present invention, a molded strip of coupling element blanks is folded by a first folder unit about its longitudinal axis while still hot into a U-shaped cross-section to provide a folded strip of coupling element blanks each having a width larger than a predetermined width of each of the coupling elements as ultimately shaped. After having been heated by a hot air blower, the hot folded strip of blanks is shaped by a second folder unit into slide fastener coupling elements of a finalized shape and dimensions by constricting stepwise the width of the strip of coupling element blanks while being continuously fed along. The second folder unit comprises a folder die wheel having a peripheral groove having the same width as the width of the coupling elements as ultimately shaped, and a plurality of folder elements disposed circumferentially in juxtaposition around the die wheel. The folder elements have respective portions or edges receivable in the peripheral groove so as to force the coupling element blanks downwardly stepwise into the peripheral groove by the folder element edges as the strip of blanks is fed through the second folder unit.

Many other advantages and features of the present invention will become manifest to those versed in the art upon making reference of the detailed description and the accompanying sheets of drawings in which a preferred structural embodiment incorporating the principles of the present invention is shown by way of illustrative example.

BRIEF DESCRIPTION OF THE DRAWINGS

FIG. 7 is a cross-sectional view of another slide fastener stringer;

FIGS. 8 and 9 are fragmentary plan views of different strips of coupling element blanks;

FIG. 11, appearing with FIG. 9, is an enlarged fragmentary plan view of a circumferential surface of an extruder die wheel;

FIG. 12, appearing with FIG. 9, is a fragmentary enlarged cross-sectional view of the die wheel shown in FIG. 11 and an extruder nozzle;

DETAILED DESCRIPTION

Molded slide fastener coupling elements of thermoplastic synthetic resin to be produced according to the method and apparatus of the present invention are first described with reference to FIGS. 1 through 9.

Figure 1:
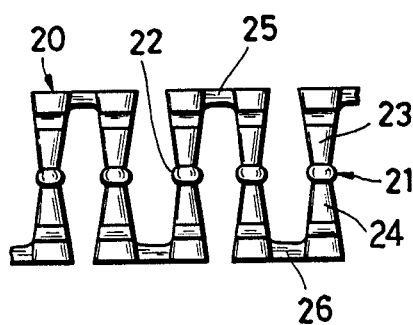
FIG. 1 is a fragmentary plan view of a strip of coupling element blanks.
Figure 2:
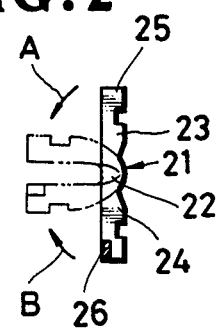
FIG. 2 is a left side elevational view, partly in cross section, of a coupling element blank shown in FIG. 1.
Figure 3:
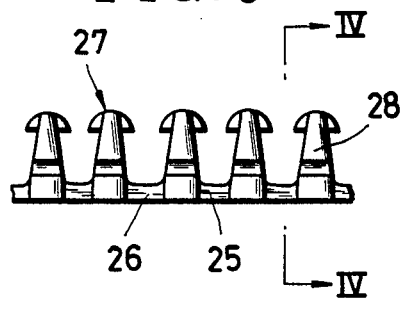
FIG. 3 is a fragmentary plan view of the strip of coupling element blanks of FIG. 1 as it is folded about its longitudinal axis into a coupling element strip of a U-shaped cross section.
Figure 4:
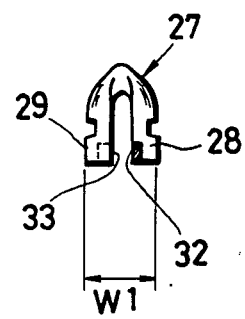
FIG. 4 is a cross-sectional view taken along line IV—IV of FIG. 3.
Figure 5:
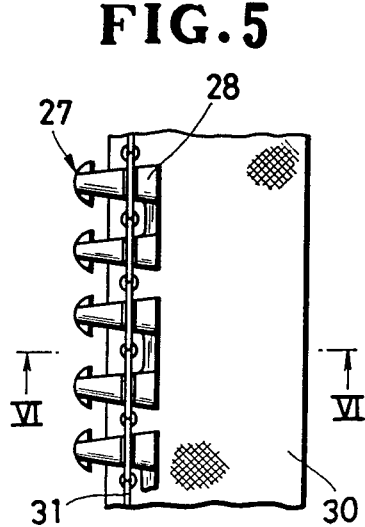
FIG. 5 is a fragmentary plan view of a slide fastener stringer including the coupling element strip of FIG. 3 which is sewn in place on a stringer tape.
Figure 6:
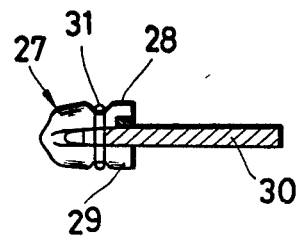
FIG. 6 is a cross-sectional view taken along line VI—VI of FIG. 5.

In FIG. 1, a molded strip of coupling element blanks 20 is shown in zigzag of meandering form and comprises a plurality of parallel element-forming bars 21 each including a central coupling head 22 and a pair of legs 23, 24 extending from the coupling head 22 in opposite directions, the element-forming bars 21 being connected to each other by connecting portions 25, 26 integral with the legs 23, 24 at their distal ends. As shown in FIG. 2, the strip of coupling element blanks 20 is folded in the directions of the arrows A, B about its longitudinal axis or the coupling heads 22 into a U- shape, and the folded strip of blanks 20 is heat-set to form a train of slide fastener coupling elements 27 as shown in FIGS. 3 and 4. Each of the coupling elements 27 has a pair of parallel opposed legs 28, 29 corresponding to the legs 23, 24 of the strip of coupling element blanks 20, the element 27 having a width W1 (FIG. 4) defined jointly by the parallel opposed legs 28, 29. The coupling elements 27 are attached to a slide fastener stringer tape 30 (FIGS. 5 and 6) by a line of sewing threads 31 with the legs 28, 29 disposed one on each side of the stringer tape 30. As shown in FIG. 7, the coupling elements 2a may have their legs 28, 29 bonded to each other at respective confronting surfaces 32, 33 (FIG. 4) thereof, and the coupling elements 27a may be sewn to, or woven or knitted into a slide fastener stringer tape 34 in a manner well known in the art.

FIG. 8 shows another molded strip of coupling element blanks 35 which includes a pair of connector threads 36, 37 embedded into a series of alternately disposed in connecting portions 38, 39 at the time of molding the strip of coupling element blanks 35. With the connector threads 36, 37, element-forming bars 40 are securely connected to each other, and the strip of coupling element blanks 35 is rendered resistant to forces applied in the directions of the arrow C which tend to stretch the strip of coupling element blanks 35 longitudinally.

According to a modification shown in FIG. 9, a molded strip of coupling element blanks 41 comprises a plurality of separate parallel element-forming bars 42 which are interconnected at their ends by a pair of connector threads 43, 44. The strips of coupling element blanks 35, 41 are also folded into a U-shape and heat-set as slide fastener coupling elements. The connector threads 36, 37 and 43, 44 may be removed later by dissolving them in a solution, or may be left so that they can be woven or knitted into a slide fastener stringer tape to attach the coupling elements to the stringer tape.

Figure 10:
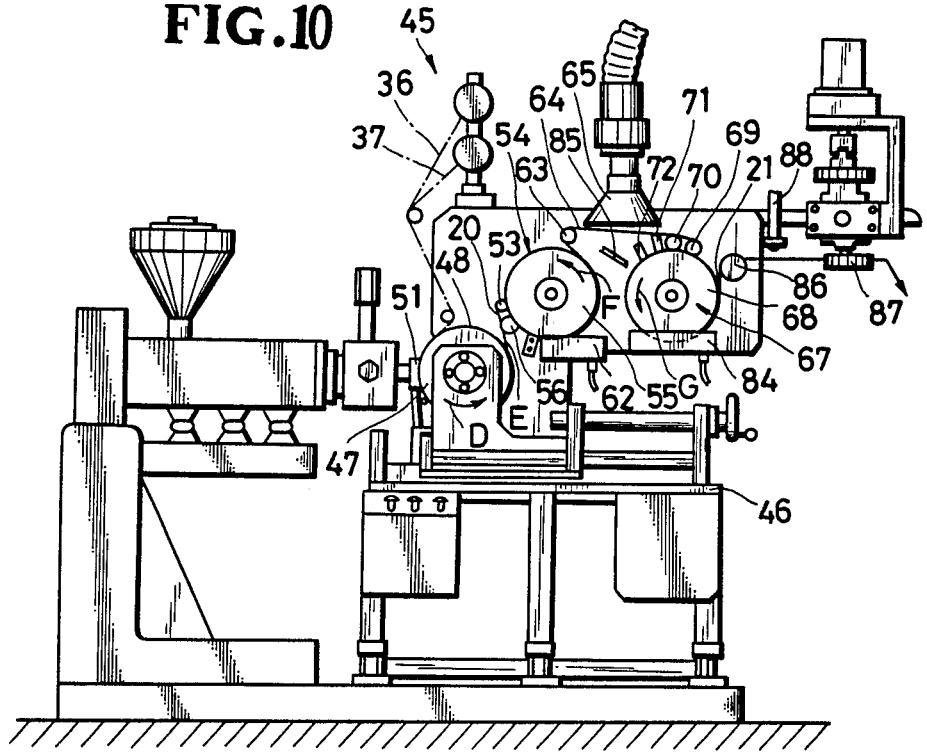
FIG. 10 is a schematic front elevational view of an apparatus according to the present invention.

FIG. 10 shows an apparatus generally designated at 45 for continuously molding such a strip of coupling element blanks and for forming the strip of blanks into a train of molded coupling elements 27 of a finalized shape. The apparatus 45 comprises a frame 46 on which is mounted a die wheel 47 for continuous rotation in the direction of the arrow D. The die wheel 47 has on and around its circumferential surface 48 (FIGS. 11 and 12) a plurality of parallel die cavities 49 for molding, for example, the element-forming bars 21 and a plurality of alternate die cavities 50 for molding, for example, the connecting portions 25, 26. A shoe 51 is held against the circumferential surface 48 of the die wheel 47 and has an extruder nozzle 52 (FIG. 12) for introducing molten thermoplastic synthetic resin successively into the die cavities 49 and hence the die cavities 50 as the die wheel 47 rotates. While the die wheel 47 revolves in the direction of the arrow D, the molten thermoplastic is solidified in the cavities 49, 50 to form a molded strip of coupling element blanks 20 which is separated from the die wheel 47 at a point E and fed around a guide roller 53. The rate of feed of the strip of coupling element blanks 20 is such that the latter will be separated from the die wheel 47 without being subjected to a substantial tension since the strip of blanks 20 as it leaves the die wheel 47 retains heat intensive enough to allow the strip 20 to be easily deformed.

Figure 13:
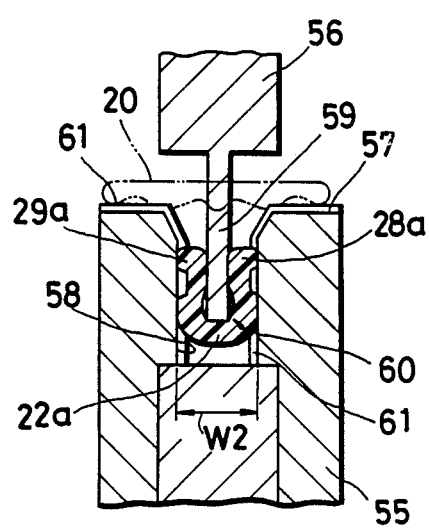
FIG. 13 is an enlarged fragmentary cross-sectional view of a portion of a first folder unit of the apparatus shown in FIG. 10.

The apparatus 45 also includes a first folder unit 54 mounted on the frame 46 adjacent to the die wheel 47. The folder unit 54 comprises a folder die wheel 55 mounted on the frame 46 for driven rotation in the direction of the arrow F at a circumferential speed which is the same as the circumferential speed of the die wheel 47, and a folder disc 56 mounted on the frame 46 for driven rotation in the direction opposite to the direction of the arrow F. As shown in FIG. 13, the folder die wheel 55 has in its circumferential surface 57 a peripheral groove 58 having a width W2 which is larger than the width W1 (FIG. 4) of each coupling element 27 as ultimately shaped. The folder disc 56 has a peripheral edge 59 disposed partly in the peripheral groove 58 in the folder die wheel 55. The molded strip of coupling element blanks 20 is introduced between the folder die wheel 55 and the folder disc 56 as they are driven to rotate, whereupon the strip of blanks 20 is force by the peripheral edge 59 of the folder disc 56 into the peripheral groove 58 in the folder die wheel 55 so as to be folded about its longitudinal axis into a U-shape, thus providing a folded strip of semi-finished coupling element blanks 60 each having a coupling head 22a and a pair of parallel spaced legs 28a, 29a extending from the coupling head 22a in a common direction. The folded strip of blanks 60 has a width equal to the width W2 of the peripheral groove 58.

Figure 14:
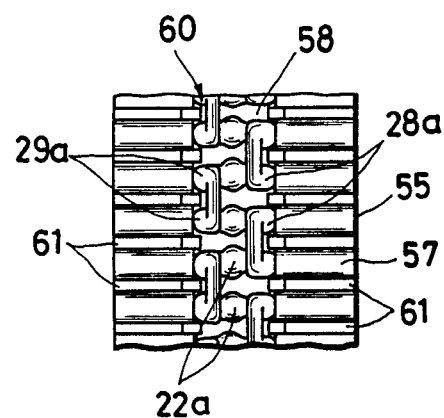
FIG. 14 is a fragmentary plan view of a circumferential surface of a folder die wheel of the first folder unit.

As shown in FIGS. 13 and 14, the folder die wheel 55 has on its circumferential surface 57 two opposed rows of guide ridges 61, 61 one at each side of the peripheral groove 58. Each of the guide ridges 61 extends transversely across a corresponding side of the circumferential surface 57 and one sidewall of the groove 58 for receiving the legs 23, 24 of the strip of blanks 20 between adjacent guide ridges 61, 61 as the strip of blanks 20 is folded into the strip of blanks 60. The guide ridges 61 are circumferentially spaced from one another at equal intervals which are equal to an inter-element space or pitch of the coupling elements 27 as ultimately shaped so that the folded coupling element blanks 60 have the same pitch as the slide fastener coupling elements 27. The lower portion of the folding die wheel 55 is immersed in a coolant such as cold water contained in a bath or reservoir 62 for cooling the folded strip of coupling element blanks 60 to set in its folded shape to a certain extent.

Figure 15:
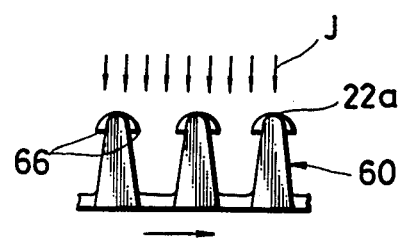
FIG. 15 is an enlarged fragmentary plan view of a folded strip of coupling element blanks as it is heated with hot air.

The folded strip of semi-finished coupling element blanks 60 as it is discharged from the first folder unit 54 is fed around a guide roll 63 (FIG. 10) and then advances along a straight path 64 with the coupling heads 22a directed upwardly, as shown in FIG. 15. A hot-air blower 65 (FIG. 10) is disposed above the path 64 for sending hot air J heated at a temperature ranging from 300° C. to 350° C., toward the coupling heads 22a so as to heat the coupling heads 22a of the folded strip of blanks 60 as it is fed along the path 64. The thermoplastic material of the coupling heads 22a becomes softer and more pliable as it is heated, thereby becoming easier to bend and fold in the subsequent bending operation. Lateral edges 66 of the respective coupling heads 22a are prevented from being heated concentrically which would result in a melting or deformation of the edges 66. On being heated, the folded strip of semi-finished blanks 60 somewhat unbends or elastically recovers its shape and retains heat intensive enough to allow the strip of blanks 60 to be bent easily through the following bending stages described below.

Figure 16:
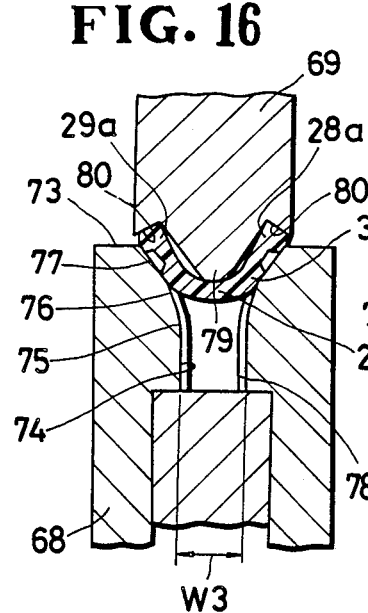
FIG. 16 is an enlarged fragmentary cross-sectional view of a second folder unit of the apparatus shown in FIG. 10, the view showing an initial folding stage of the second folder unit.
Figure 17:
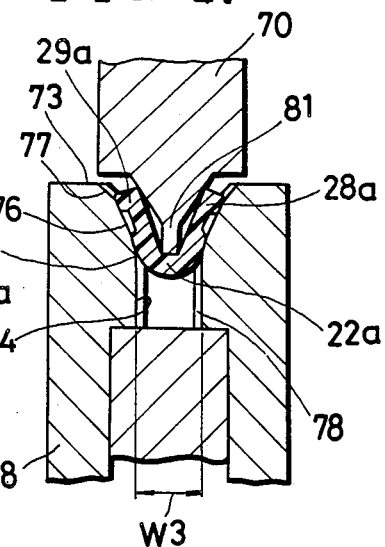
FIG. 17 is a view similar to FIG. 16, showing a first intermediate folding stage of the second folder unit.
Figure 18:
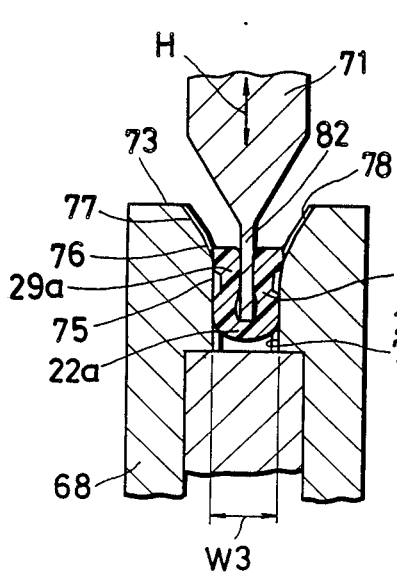
FIG. 18 is a view similar to FIG. 16, showing a second intermediate folding stage of the second folder unit.

The hot folded but somewhat unbent strip of semi-finished coupling element blanks 60 is then introduced into a second folder unit 67 disposed next to or downstream of the first folder unit 54, as shown in FIG. 10. The second folder unit 67 comprises a folder die wheel 68 mounted on the frame 46 for driven rotation in the direction of the arrow G at a circumferential speed which is the same as the circumferential speed of the die wheels 47, 55, and four successive folder elements 69, 70, 71 and 72 disposed circumferentially in juxtaposition around the folder die wheel 68 in the described order in the direction of the arrow G. Two of the folder elements 69–72 comprise folder discs 69, 70, respectively, mounted on the frame 46 for driven rotation in the direction opposite to the direction of the arrow G. The remaining folder elements comprise folder blades 71, 72 reciprocably mounted on the frame 46 and movable toward and away from the axis of the folder die wheel 68. Driving means for reciprocating the blades 71, 72 are not shown for clarity. As shown in FIGs. 16 through 18, the folder die wheel 68 has in its circumferential surface 73 a peripheral groove 74 having a width W3 which is equal to the width W1 (FIG. 4) of each of the coupling elements 27 as ultimately shaped. The peripheral groove 74 has an outwardly diverging upper portion defined jointly by three contiguous pairs of opposed oblique flat side surfaces 75, 75; 76, 76 and 77, 77 for the purposes described below. The folder die wheel 68 also has a pair of rows of guide ridges 78, 78 disposed circumferentially on the respective sidewalls of the peripheral groove 74, the guide ridges 78 being structurally and functionaly the same as the guide ridges 61 on the die wheel 55.

The folder disc 69, as shown in FIG. 16, has on its circumferential surface a central edge or protuberance 79 of a V-shaped cross-section, and a pair of lateral oblique shoulders 80, 80 disposed one on each side of the central protuberance 79 and diverging downwardly toward the die wheel 68. The protuberance 79 is disposed partly in the peripheral groove 74 in the folder die wheel 68 for engagement with the coupling heads 22a, and the shoulders 80, 80 are spaced a distance from the circumferential surface 73 of the die wheel 68 for receiving the respective legs 28a, 29a. After having been heated by the hot blower 65 (FIG. 10), the folded but somewhat unbent strip of semi-finished coupling element blanks 60 is fed around the folder disc 69 and then is introduced between the folder disc 69 and the folder die wheel 68 while they are driven to rotate. Consequently, the strip of the blanks 60 is forced jointly by the protuberance 79 and the shoulders 80 into the peripheral groove 74 with the legs 28a, 29a held in position by the side surfaces 76, 77 as shown in FIG. 16. In this condition, each of the coupling heads 22a of the blanks 80 is located immediately above the side surfaces 75. Continuous rotation of the folder die wheel 68 causes the thus folded strip of blanks 60 to advance toward the next adjacent folder disc 70 which is also driven to rotate. The folded strip of blanks 60 is still hot.

The folder disc 70, as shown in FIG. 17, has a peripheral edge 81 disposed in the peripheral groove 74 in the folder die wheel 68, the edge 81 extending inwardly beyond the protuberance 79 of the folder disc 69 shown in FIG. 16. Thus the still hot folded strip of blanks 60, as it passes around the folder disc 70, is lowered by the edge 81 from the position of FIG. 16 to the position of FIG. 17 in which the coupling head 22a is located immediateely above a lower uniform-width portion of the peripheral groove 74. The legs 28a, 29a are bent slightly toward each other into a V-shape, each of the legs 28a, 29a extending between the side surfaces 77, 75 across the side surface 76. The thus shaped strip of blanks 60 is still hot and, as the folder die wheel 68 rotates, it is advanced to the next adjacent folder blade 82.

As shown in FIG. 18, the reciprocable folder blade 71 has a lower thin edge 82 engageable with the coupling heads 22a. Upon reciprocation of the blade 71, the edge 82 forces the coupling heads 22a slightly downwardly with the legs 28a, 29a held against the side surfaces 75, 75 of the peripheral groove 74 until the coupling heads 22a are located immediately above the bottom wall of the groove 74. The strip of coupling element blanks 60 thus squeezed has a nearly U-shaped cross-section and still retains enough to allow the strip to be deformed.

Figure 19:
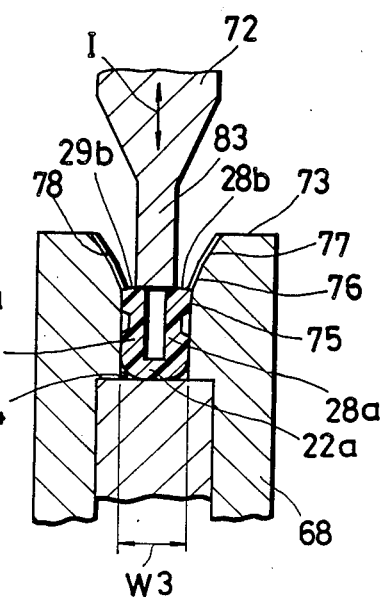
FIG. 19 is a view similar to FIG. 16, showing the final folding stage of the second folder unit.

With continued rotation of the die wheel 68, the nearly U-shaped strip of coupling element blanks 60 is introduced between the folder blade 72 and the folder die wheel 68. As shown in FIG. 19, the folder blade 72 includes a lower edge 83 engageable with distal ends 28b, 29b of the opposed legs 28a, 29a. Upon reciprocation of the blade 72, the lower edge 83 forces the coupling element blanks 60 downwardly until the coupling heads 22a abut against the bottom wall of the groove 74, to thereby provide a train of side fastener coupling elements 27 of a finalized shape and dimensions.

The lower portion of the folder die wheel 68 is immersed in a coolant such as cold water contained in a reservoir 84 for cooling the slide fastener coupling elements 27 to set in their finalized shape as they pass through the coolant. A nozzle 85 is mounted on the frame 46 downstream of the folder blade 72 for ejecting a coolant such as cold water into the peripheral groove 74 for cooling the coupling elements 27 received therein.

The slide fastener coupling elements 27 thus shaped and heat-set are fed around a guide roller 86 and then they are discharged by a discharging unit 87 which is driven as by a torque motor (not shown) such that the coupling elements 27 are discharged at a speed which is substantially the same as the speed at which the strip of coupling element blanks 20 is molded, or the peripheral speed of the die wheel 47. Disposed between the guide roller 86 and the discharging unit 87 is an air nozzle 88 for ejecting dry air toward the coupling elements 27 for blowing the coolant off the coupling elements 27.

The connecting threads 36, 37 where to be incorporated are supplied between the die wheel 47 and the shoe 51, as shown by the phantom lines in FIG. 10.

The method and apparatus of the present invention have advantages as follows: As the molded strip of coupling element blanks is first folded into a U-shaped cross-section to provide a folded strip of blanks whose width is larger than a predetermined width of the coupling elements as ultimately finished, the thermoplastic material of the molded strip of blanks can be deformed without causing irregular stretching. Thus a folded strip of blanks is then heated with hot air and, while retaining heat intensive enough to allow itself to be bent easily, the folded strip is subjected to successive bending stages in which the width of the folded strip of blanks is constricted stepwise to the predetermined width. Such successive bending of the folded strip of blanks can be achieved solely by a second bending unit which comprises a folder die wheel and a plurality of folder elements disposed circumferentially in juxtaposition around the folder die wheel. The second folder unit thus constructed is relatively compact and hence the apparatus is rendered compact and occupies a relatively small space for installation.

Although various minor modifications may be suggested by those versed in the art, it should be understood that I wish to embody within the scope of the patent warranted hereon, all such embodiments as reasonably and properly come within the scope of my contribution to the art:

What is claimed is:

1. A method of continuously manufacturing molded slide fastener coupling elements, comprising the steps of:

(a) introducing thermoplastic synthetic resin successively into cavities around a circumferential surface of a die wheel while the latter is rotating, to mold strip of coupling element blanks:

(b) removing said strip of coupling element blanks continuously out of said cavities;

(c) continuously folding the strip of coupling element blanks about its longitudinal axis while still hot into a U-shaped cross-section by forcing the strip of coupling element blanks into a first groove having a width larger than the desired width of the slide fastener coupling elements to be ultimately shaped, while holding the coupling element blanks in a uniformly-spaced relation to one another by retaining and guiding said coupling element blanks during said folding in said first groove by a pair of spaced guide ridges respectively disposed on opposite sides of said first grooves above said coupling element blanks in said first groove;

(d) thereafter heating the folded strip of coupling element blanks while being fed along a path;

(e) shaping the folded coupling element blanks into slide fastener coupling elements of a final shape and dimensions, while still hot and being continuously fed along, by forcing, in a number of discrete steps, the folded coupling element blanks into a second groove having a width equal to the desired width of the ultimately-shaped slide-fastener coupling elements, while holding the folded coupling element blanks in a uniformly-spaced relation to one another by retaining and guiding said coupling element blanks during said shaping in said second groove by a pair of space guide ridges respectively disposed on opposite sides of said second groove above said coupling element blanks in said second groove;

(f) cooling said slide fastener coupling elements while being continuously fed along, to set in their final shape and dimensions; and (g) discharging said slide fastener coupling elements continuously at a speed which is substantially the same as the speed at which the strip of coupling element blanks is molded continuously on said die wheel.

2. A method according to claim 1, between said folding and said heating steps cooling the folded coupling element blanks to the folded shape.

3. A method according to claim 1, wherein the folded coupling elements blanks includes coupling heads which, during said heating step, are heated with hot air.

* * * * *